United States Patent [19]
Karim

[11] Patent Number: 5,883,193
[45] Date of Patent: Mar. 16, 1999

[54] ADHESIVE COMPOSITIONS WITH DURABILITY UNDER CONDITIONS OF HIGH HUMIDITY

[75] Inventor: Naimul Karim, Maplewood, Minn.

[73] Assignee: Minnesota Mining and Manufacturing Company, St. Paul, Minn.

[21] Appl. No.: 886,750

[22] Filed: Jul. 1, 1997

[51] Int. Cl.⁶ ............................. C08F 8/34; C08F 283/10
[52] U.S. Cl. ........................ 525/113; 525/529; 525/531
[58] Field of Search ..................................... 525/113, 529, 525/531

[56] References Cited

U.S. PATENT DOCUMENTS

| | | | |
|---|---|---|---|
| 3,954,898 | 5/1976 | Hirota et al. | 525/113 |
| 4,503,174 | 3/1985 | Vasta | 525/113 |
| 4,806,577 | 2/1989 | Takahashi et al. | 523/445 |
| 4,833,204 | 5/1989 | Yusa et al. | 525/113 |
| 5,086,088 | 2/1992 | Kitano et al. | 522/170 |
| 5,198,065 | 3/1993 | Eadara | 156/315 |
| 5,204,386 | 4/1993 | Ersun-Hallsby et al. | 525/529 |
| 5,262,232 | 11/1993 | Wilfong et al. | 428/327 |
| 5,362,421 | 11/1994 | Kropp et al. | 252/512 |
| 5,475,956 | 12/1995 | Agrawal et al. | 52/208 |
| 5,739,209 | 4/1998 | Lassila et al. | 525/113 |

FOREIGN PATENT DOCUMENTS

| | | | |
|---|---|---|---|
| 0 342 035 | 11/1989 | European Pat. Off. . | |
| SHO 47-27782 | 7/1972 | Japan . | |
| SHO 48-23659 | 7/1973 | Japan . | |
| 58-021419 A | 2/1983 | Japan . | |
| 58-21419 | 2/1983 | Japan . | |
| 215087 | 10/1985 | Japan | 525/113 |
| 5-185556 | 7/1993 | Japan . | |
| 5185556 A | 7/1993 | Japan . | |
| WO 93/01248 | 1/1993 | WIPO . | |
| WO 93/05122 | 3/1993 | WIPO . | |
| WO 94/14867 | 7/1994 | WIPO . | |

*Primary Examiner*—Peter A. Szekely

[57] ABSTRACT

A thermosettable adhesive composition that includes a monomeric or partially polymerized composition that includes at least one polymerizable acrylic or methacrylic acid ester of a non-tertiary alcohol, a thermosettable epoxy resin, an amine curative, a silane coupling agent, and a chelating agent.

24 Claims, No Drawings

ADHESIVE COMPOSITIONS WITH DURABILITY UNDER CONDITIONS OF HIGH HUMIDITY

BACKGROUND OF THE INVENTION

The invention relates to maintaining adhesion under conditions of high humidity.

A variety of applications require the maintenance of a structural or semi-structural adhesive bond to glass or between two substrates, one of which is glass, under conditions of heat and high humidity. In the automotive industry, for example, structural adhesives are used to bond metal buttons to glass windshields to provide a base for mounting rear view mirrors. It is difficult, however, to form adhesive bonds that have the long term durability required for particular applications. Adhesive bonds to glass tend to fail over time or when subjected to more rigorous conditions such as heat and high humidity. The interface between the substrate and the adhesive is a particularly weak point in terms of stability in the presence of humidity. Consequently, the more common failure mode is adhesive rather than cohesive.

To improve adhesion, substrates are often treated either chemically, e.g., with a chemical primer, or mechanically, e.g., by abrading the surface. Chemical priming methods involve pre-treating the surface with organic solvents and reactive chemicals such as chromic sulfuric acid, which present environmental and toxicity issues. Mechanical treatments add additional process steps to a manufacturing operation.

SUMMARY OF THE INVENTION

In one aspect, the invention features a thermosettable adhesive composition that includes a monomeric or partially polymerized composition that includes at least one polymerizable acrylic or methacrylic acid ester of a non-tertiary alcohol, a thermosettable epoxy resin, an amine curative, a silane coupling agent, and a chelating agent. In one embodiment, the thermosettable adhesive composition further includes an ethylenically unsaturated monomer different from the polymerizable acrylic or methacrylic acid ester. In other embodiments, the thermosettable adhesive composition further includes a hydroxy acrylate (e.g., 2-hydroxy-3-phenoxy propylacrylate).

Useful chelating agents include aminocarboxylates, crown ethers, 1,3-diketones, imines, oximes, phenols, and polyols. Examples of preferred chelating agents are dibenzo-18-crown-6, ethylenebis(salicylimine), catechol, 8-hydroxyquinoline, salicylaldehyde, and glycerol. The chelating agent is preferably present in the composition in an amount in the range of between about 0.25 to about 4% by weight of the thermosettable adhesive composition.

Preferred silane coupling agents are selected from the group consisting of epoxy silanes, alkoxy silanes, aminosilanes, and combinations thereof. The silane coupling agent is preferably present in the composition in an amount in the range of between about 0.25 to 5% by weight, more preferably between about 0.25 to 1% by weight of the thermosettable composition.

The epoxy resin is preferably present in the thermosettable composition in an amount of no greater than about 150 parts per 100 parts of said monomeric or partially polymerized composition, more preferably between 50 and 110 parts per 100 parts of said monomeric or partially polymerized composition.

The ratio of amine equivalents of the amine curative to epoxy equivalents is preferably in the range of about 0.8:1 to about 1.5:1. A preferred amine curative is dicyandiamide.

In another aspect, the invention features a thermosettable adhesive composition that includes a polyacrylate or a polymethacrylate, a thermosettable epoxy resin, an amine curative, a silane coupling agent, and a chelating agent.

In another aspect, the invention features a multi-layer structure that includes: a first layer that includes a thermosettable adhesive composition that includes a monomeric or partially polymerized composition having at least one polymerizable acrylic or methacrylic acid ester of a non-tertiary alcohol, a thermosettable epoxy resin, and an amine curative; and a second layer disposed on the first layer, the second layer including a chelating agent and a silane coupling agent. In one preferred embodiment, the first layer of the multi-layer structure includes a polyacrylate or a polymethacrylate, a thermosettable epoxy resin, and an amine curative. In another preferred embodiment, the multi-layer structure further includes a third layer that includes a chelating agent and a silane coupling agent. The third layer is disposed on a surface of the first layer that is opposite the surface on which the second layer is disposed.

The thermosettable adhesive compositions of the invention can also be used in a method for bonding a first substrate to a second substrate. The method includes providing one of the substrates with a thermosettable adhesive composition, contacting the thermosettable adhesive composition with the other of the substrates, and thermally curing the thermosettable adhesive composition.

Particularly useful substrate combinations include glass to glass, glass to metal, glass to ceramic, and glass to painted metal.

In preferred embodiments, the invention features a method of bonding a mirror button to a windshield that includes providing one of the mirror button or the windshield with a thermosettable adhesive composition that includes a polyacrylate or a polymethacrylate, a thermosettable epoxy resin, an amine curative, a silane coupling agent, and a chelating agent, contacting the adhesive composition with the other of the mirror button or the windshield, and thermally curing the thermosettable adhesive composition.

The adhesive compositions feature internal primers. As a result, there is no need to pre-treat a surface with caustic priming chemicals or subject the surface to mechanical abrasion. Thus, the hazards and inconvenience associated with priming operations are eliminated. In addition, the adhesive bond is maintained under conditions of heat and high humidity.

The embodiment in which the chelating agent and the silane coupling agent are disposed on the surface of the adhesive composition allows the use of chelating agents and silane coupling agents that might otherwise react with the epoxy component or interfere with the cure of the (meth)acrylate or epoxy resin components. In addition, as compared to embodiments in which the chelating agent and silane coupling agent are incorporated into the adhesive composition, relatively smaller amounts of chelating agent and silane coupling agent can be used while maintaining durable structural and semi-structural bond performance.

Other features and advantages of the invention will be apparent from the description of preferred embodiments thereof, and from the claims.

DESCRIPTION OF THE PREFERRED EMBODIMENTS

The thermosettable adhesive composition includes a monomeric or partially polymerized composition that includes at least one polymerizable acrylic or methacrylic acid ester of a non-tertiary alcohol, a thermosettable epoxy resin, an amine curative, a silane coupling agent, and a chelating agent.

The adhesive composition is formulated to provide durable adhesive bonds to glass substrates such that the thermoset adhesive composition will maintain adhesion to a glass substrate and between two substrates (one of which is glass) under extreme aging conditions such as high humidity and high temperature. The adhesive composition also maintains adhesion under vibrational forces, e.g., the vibrational forces typically encountered by such substrates in applications involving automobiles. In addition, the adhesive composition is formulated such that to the extent failure occurs, the failure is predominantly cohesive rather than adhesive.

One measure of the durability of the adhesive composition is its retention of initial overlap shear strength after wet soaking for an extended period. Preferably the adhesive composition retains at least about 50%, more preferably 90%, of its initial overlap shear strength after a three day water soak at 70° C. as measured according to the test procedure set forth in the Examples section, below. Preferred adhesive compositions will retain at least about 50% of initial overlap shear strength after a two week water soak at 70° C., more preferably after a four week water soak at 70° C.

Useful adhesive compositions exhibit an overlap shear from a stainless steel substrate under conditions of 50% relative humidity and 70° C. of at least about 5 MPa, more preferably at least about 7 MPa, as measured according to the test procedure described in the Examples section, below.

The Monomeric or Partially Polymerized Composition

The monomeric or partially polymerized composition is preferably moderately polar and includes at least one polymerizable (meth)acrylate monomer. Optionally, a variety of moderately polar ethylenically unsaturated monomers, non-polar ethylenically unsaturated monomers, hydroxy acrylates, and combinations thereof can be added to the (meth)acrylate component or copolymerized with the (meth) acrylate component to achieve an adhesive composition having the desired level of adhesive performance and polarity.

The polymerizable (meth)acrylate is a monofunctional acrylic or methacrylic ester of a non-tertiary alcohol. Included in this class of acrylic acid esters and methacrylic acid esters are isooctyl acrylate, 2-ethylhexyl acrylate, octyl acrylate, isononyl acrylate, isodecyl acrylate, decyl acrylate, dodecyl acrylate, lauryl acrylate, hexyl acrylate, butyl acrylate, octadecyl acrylate, 2-phenoxyethyl acrylate, and benzylacrylate. Suitable methacrylic acid esters include methyl methacrylate, ethyl methacrylate, and propyl methacrylate, and combinations thereof.

Moderately polar and non-polar ethylenically unsaturated monomers may be added to improve structural properties (e.g., cohesive strength) of the adhesive composition. Examples of suitable moderately polar and non-polar monomers include isobornyl acrylate, tetrahydrofurfuryl acrylate, glycidyl acrylate, 3,3,5 trimethylcyclohexyl acrylate, cyclohexyl acrylate, t-butyl acrylate, and nitrogen containing monomers such as N,N-dimethyl acrylamide, N-octyl acrylamide, N-vinyl-2-pyrrolidone, N-vinyl caprolactam, N-vinyl piperidine, and acrylonitrile, and combinations thereof. The moderately polar and non-polar ethylenically unsaturated monomers can be present in an amount in the range of about 15 to about 70% based upon the weight of the (meth)acrylate component.

Preferred adhesive compositions include an hydroxy acrylate. Addition of an hydroxy acrylate further improves the durability of the adhesive bond under conditions of high humidity. Examples of suitable hydroxy acrylates include hydroxy ethyl acrylate, hydroxy propylacrylate, hydroxy butyl acrylate, 2-hydroxy-3-phenoxy propyl acrylate, caprolactone acrylate, and 2-acryloyloxyethyl-2-hydroxyethyl-o-phthalate, or combinations thereof. The hydroxy acrylate can be present in an amount no greater than about 30% by weight based upon the weight of the (meth)acrylate component, more preferably no greater than about 20% by weight, most preferably from about 2 to 15% by weight.

The monomer mixture can be polymerized by various techniques, with photoinitiated bulk polymerization being preferred. An initiator is preferably added to aid in polymerization of the monomers. The type of initiator used depends on the polymerization process. Useful photoinitiators include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1, 1-propanedione-2-(o-ethoxycarbonyl)oxime. Examples of commercially available photoinitiators include Irgacure 651 (available from Ciba-Geigy), KB-1 (available from Sartomer), Carocure 1173 (Ciba-Geigy), and Lucerin TPO (available from BASF). Photoinitiators are typically added in amounts ranging from about 0.02 to about 10 parts per 100 parts monomer, preferably to about 0.1 to about 0.5 parts per 100 parts monomer. Examples of suitable thermal initiators include azo-bis(isobutyronitrile) and peroxides.

Epoxy Resin

Useful thermosettable epoxy resins are those compounds containing an average of more than one, and preferably at least two epoxy groups per molecule. The epoxy resin is either solid, semi-liquid or liquid at room temperature. Combinations of different types of epoxy resins can be used. Suitable epoxy resins include both monomeric and polymeric epoxy resins and can be aliphatic, cycloaliphatic, and aromatic, and blends thereof. Useful epoxy resins include phenolic epoxy resins, bisphenol epoxy resins, hydrogenated epoxy resins, halogenated bisphenol epoxy resins, novolac epoxy resins, and mixtures thereof. Preferred epoxy resins are those formed by the reaction product of bisphenol-A with epicholorohydrin.

Examples of suitable commercially available aromatic epoxy resins include MY™-720 (from Ciba Specialty Chemicals Corporation, Brewster, N.Y.), ERL™-0510 (from Ciba Specialty Chemicals Corporation), the EPON™ series of materials from Shell Chemical Co., Houston, Tex. (e.g., EPON™ HPT-1071, EPON™ HPT-1072, EPON™ HPT-1079, EPON™ 828, EPON™ 1001, and EPONEX™ 1510), and the D.E.R.™, D.E.N.™ and QUATREX™ families of materials from Dow Chemical Company, Midland, Mich. (e.g., D.E.R.™ 332, D.E.R.™ 661, D.E.N.™ 438, and QUATREX™ 1010).

Examples of suitable aliphatic epoxy resins include polyglycidyl ethers of aliphaticpolyols, e.g., glycerol and hydrogenated 4,4'-dihydroxydiphenyl-dimethylmethane, and cycloaliphatic epoxy resins.

Useful adhesive compositions include an epoxy resin content of 150 parts per 100 parts of themonomeric or partially polymerized composition (hereinafter referred to as "pph"), preferably no greater than 120 pph, most preferably in the range of between about 50 to about 110 pph.

Amine Curative

An amine curative is added to effect the curing of the epoxy resin. Preferred amine curatives are insoluble in the adhesive composition at room temperature, which aids in shelf life stability of the composition. Examples of suitable amine curatives includedicyandiamide and polyamine salts. Useful amine curatives are commercially available under the trade designation Omicure™ (from Omicron Chemical), Ajicure™ (from Ajinomoto Chemical, Teaneck, N.J.), and Ancamine™, e.g., Ancamine 2337, (from Air Products, Allentown, Pa.). The amine curative is included in an amount sufficient to effect the curing of the epoxy resin under heat. The ratio of amine equivalents (i.e., the amount of amine groups available for reaction with the epoxy resin) in the amine curative to epoxy equivalents (i.e., the number of epoxy groups available for bonding) preferably ranges from 0.8:1 to 1.5:1, more preferably 0.8:1 to 1.2:1.

Silane Coupling Agent

The silane coupling agents have at least one hydrolizable functionality and at least one functionality capable of interacting with the adhesive composition. Silane coupling agents have the following general formula

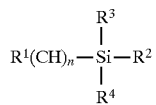

Useful silane coupling agents include those having the following organic functionalities wherein $R^1$ is either alkyl, vinyl, halogen, epoxy, acrylate, methacrylate, amine, mercapto, styryl or ureido; and $R^2$, $R^3$, and $R^4$ is halo, methoxy, ethoxy, propoxy, or beta-methoxyethoxy; and n is an integer between 0 and 8. In preferred silane coupling agents, at least one of $R^2$, $R^3$, and $R^4$ is hydrolizable, and $R^1$ is capable of interacting with the adhesive composition. Useful silane coupling agents include epoxysilanes, alkoxy silanes, aminosilanes, mercapto silanes, acryloxy silanes, methacryloxy silanes, vinyl silanes, ureido silanes, and isocyanato silanes. Examples of suitable silane coupling agents include gamma-glycidoxypropyltrimethoxysilane, gamma-glycidoxypropyl methlydiethylsilane, and beta (3,4-epoxycyclohexyl)ethyltrimethoxysilane. Suitable commercially available silane coupling agents include A-186 epoxysilanes (from OSi Specialties, Endicott, N.Y.), RC-1, A-151, A-171, A-172, and A-2171 vinyl silanes (from OSi Specialties), silane esters, e.g., isobutyltrimethoxy silane, and A-137, A-162, and A-163 silane esters (from OSi Specialties), A-1160 and Y-11542 mercapto silanes (from OSi Specialties), and A-1310 isocyano silanes (from OSi Specialties).

Silane coupling agent is preferably added in an amount of from about 0.1 to 5% by weight, more preferably 0.25 to 1% by weight, based upon the total weight of the adhesive composition.

Chelating Agent

The term "chelating agent" refers to a polar organic molecule that is capable of completing with a metal ion to close a heterocyclic ring. Two conditions are necessary to form a metal chelate: (a) the presence of two appropriate functional groups having donor atoms capable of combining with a metal atom by donating a pair of electrons to the metal atom, and (b) the functional groups being situated in the molecule to permit the formation of a ring in which a metal atom is the closing member.

The chelating agent is preferably a heat activated chelating agent that is activated at a temperature of at least about 70° C., more preferably at least about 120° C., most preferably at least about 140° C.

Examples of suitable classes of chelating agents include aminocarboxylates, crown ethers, 1,3,-diketones, imines, oximes, phenols, and polyols. Useful chelating agents include N,N-bis(2-hydroxyl)glycine (commercially available under the designation "Bicine" from Aldrich, Milwaukee, Wis.), tetrasodium salts of ethylenediaminetetraacetic acid anhydride (commercially available under the trade designation "Versene 220" from Dow Chemical, Midland, Mich.), dibenzo-18-crown-6, thenoyltrifluoroacetone, ethylenebis(salicylimine) (commercially available under the trade designation "Salen" from Strem Chemicals, Inc., Newburyport, Mass.), dimethylglyoxime, catechol, catechol-novolac, 8-hydroxyquinoline, salicylaldehyde, and glycerol.

The chelating agent and the silane coupling agent are present in amounts sufficient to improve the durability of the adhesive bond to glass and metal substrates when exposed to high humidity. The amount of chelating agent preferably ranges from about 0.25 to about 4% by weight, more preferably 1 to 2% by weight, based upon the total weight of the adhesive composition.

Accelerator

The adhesive composition may optionally include an accelerator to aid in achieving full cure of the epoxy resin or to achieve full cure when exposed to heat for shorter periods of time. Imidazoles that are insoluble in the (meth)acrylate component and epoxy resin are particularly suitable for use as accelerators because of their ability to extend the shelf life of compositions that include an uncured epoxy resin and an amine curative. Examples of suitable imidazoles include 2,4-diamino-6-(2'-methyl-imidazolyl)-ethyl-s-triazine isocyanurate, 2-phenyl-4-benzyl-5-hydroxymethylimidazole, and Nickel phthalate, and 2-[beta-{2'-methylimidazolyl-(1)}]-ethyl-4,6-diamino-s-triazine (commercially available under the trade designation CUREZO® 2MZ-Azine from Air Products).

The amount of accelerator preferably ranges from about 0.5% to about 5% by weight based upon the total weight of the adhesive composition.

Other additives that can be blended into the adhesive composition to alter the characteristics of the composition include, e.g., fillers (e.g., Aerosil R972 hydrophobic filler (available from Degussa Corp., Dublin, Ohio) and Cab-O-Sil M5 ydrophilic silica (available from Cabot, Corp., Tuscola, Ill.)), glass and polymeric hollow microspheres, pigments (e.g., Penncolor 9B117 available from penncolor, Doylestown, Pa.), plasticizers, flame retardants, thickening agents, and antioxidants.

Use

The thermosettable adhesive compositions are useful for bonding objects to surfaces such as glass including, e.g., ceramic frit, abraded glass, and etched glass, ceramic, metals, and painted metals. Thethermosettable adhesive composition is particularly useful for bonding objects to glass, such as metal mirror buttons to automobile windshields.

The thermosettable adhesive composition can be in the form of a film with or without a support carrier, e.g., a self-supporting film, or a film disposed on a release liner or between two release liners. The composition can be polymerized (e.g., with UV radiation) so as to crosslink the monomeric or partially polymerized component of t he adhesive composition. The thermosettable adhesive composition, preferably in the form of a film or tape, can then be applied to a surface of a substrate, contacted with a second substrate, and then exposed to heat to initiate the epoxy curing mechanism. Typical cure conditions include exposing the adhesive composition to a temperature sufficient to cure the adhesive composition, preferably a temperature in the range of between about 110° C. to about 220° C., for a period of a few minutes to several hours.

The thermosettable adhesive composition can also be adhered to a mounting button (e.g., a metal mounting button used to mount a rearview mirror onto a windshield), which is then adhered to a glass substrate (e.g., a windshield or a fritted portion of a windshield). Slight heat and small pressure can optionally be applied to secure the button to the glass substrate while the mounting button/glass substrate assembly is being further processed. The entire assembly is then placed in an autoclave and subjected to an autoclave cycle where it is heated to a temperature sufficient to cure the adhesive to a thermoset state. Particularly useful thermosettable adhesive compositions cure within the temperature range of the autoclave cycles conventionally used in the automotive windshield manufacturing industry.

The thermosettable adhesive compositions can also be used to bond two substrates together by providing a thermosettable adhesive composition that includes a polymerized (meth)acrylate component, e.g., a polyacrylate or a polymethacrylate, on a substrate, contacting the adhesive composition with a second substrate, and curing the epoxy resin.

The invention will now be described further by way of the following examples.

EXAMPLES

Test Procedures

Overlap Shear Strength

The test substrates used were 1) a glass panel laminated to an aluminum strip, 2) two stainless strips laminated together, and 3) two aluminum strips laminated together.

For test substrate 1, a 5.08 cm×12.70 cm×0.40 cm tempered float glass (Abrissa Industrial Glass, Ventura, Calif.) was used. The air side of the float glass was identified as the side of the glass that does not exhibit a bluish color when subjected to a UV light having a wavelength of 254 nm. The air side of the glass plate was cleaned three times with a 50:50 solution of isopropyl alcohol/deionized water using a clean, lint-free cloth.

The aluminum test strip was a 2.54 cm×10.16 cm×0.015 cm strip of 2024-T3 bare aluminum from Alcoa. About a third of one side of the strip was scrubbed using a heavy duty Scotch-Brite™ scour pad (Minnesota Mining & Manufacturing Co., St. Paul, Minn.). The scrubbed bonding surface was then rinsed under running deionized water. The scrubbed, rinsed aluminum coupon was placed in a 100° C. oven for 60 minutes, then allowed to equilibrate to room temperature prior to making the test overlap shear test sample. Treated aluminum coupons were prepared and used on the same day.

One of the release liners was removed from a 1.27 cm×2.54 cm piece of tape and the tape was applied to the end of the cleaned, dried aluminum coupon so that the 2.54 cm dimension matched the 2.54 cm dimension of the aluminum strip, and the 1.27 cm dimension extended along the 10.16 cm length of the coupon. The taped aluminum strip was then applied to the air side of the cleaned glass plate. The aluminum coupon was supported by another glass plate (not attached to it), and the test sample was rolled three times with a 6.8 kg roller. The prepared sample was then baked in an oven for 25 minutes at 140° C. The sample was equilibrated at room temperature (about 21° C.) for 24 hours prior to testing or soaking in water.

For test substrate 2, two AISI 304 type stainless steel strips of dimension 2.54 cm×7.62 cm×0.091 cm were cleaned twice with a 50:50 solution of isopropyl alcohol/deionized water using a clean, lint-free cloth before applying a 1.27 cm×2.54 cm piece of tape according to the procedure described above.

For test substrate 3, two aluminum strips of the type and dimension described for substrate 1 were used. Prior to use, the aluminum strips were treated in the same way as described for substrate 1.

For the initial values of overlap shear strength (INIT), the test panels were then pulled apart using an Instron Tensile Tester at a speed of 0.508 cm/minute after the samples had equilibrated at room temperature for 24 hours as detailed above. Test results are given in megapascals (MPa). The failure mode was also recorded as the percent adhesive failure and the % cohesive failure, e.g., 75:25 indicated that the 75% of the adhesive coated surface failed adhesively and 25% of the adhesive coated surface failed cohesively, or if one of the test panels failed. An adhesive failure was noted when the adhesive pulled away cleanly from either of the test panels. A cohesive failure was noted when the adhesive split and both test panels had portions of the adhesive adhered to them.

Test samples were also soaked in a 0.2% by weight soap solution Liqui-Nox™ soap (Alconox, Inc., New York, N.Y.) in deionized water before testing for overlap shear. Prepared overlap shear samples as detailed above were placed in the solution in a gallon jar so that the solution covered the samples. The container was then placed in a 70° C. oven under atmospheric pressure for a specific period of time (1, 2, or 4 weeks). Plastic wrap or aluminum foil was placed over the top of the jar to prevent evaporation of the solution from the jar without causing an increase in vapor pressure in the container.

Example 1

A solution of n-butyl acrylate (BA) and N-vinylcaprolactam (NVC) was prepared by mixing 150 grams of BA and 150 grams of NVC, and heating at about 49° C. until a solution was formed. A BA/NVC syrup was then prepared by mixing 300 grams more of BA with the BA/NVC solution and 0.6 grams of a benzil dimethyl ketal (KB-1 photoinitiator available from Sartomer) and sparging with nitrogen for 15 minutes. The solution was then exposed in a nitrogen atmosphere to ultraviolet black lights to a consistency of warm honey (approximately 2500 to 5000 centipoise).

An epoxy mixture was prepared by mixing 918 grams of diglycidyl ether of bisphenol A (EPON™ 828 available from Shell Chemical Co.), 162 grams of diglycidyl ether oligomer of bisphenol A (EPON™ 1001 available from Shell Chemical Co.), 120 grams of hydrogenated diglycidyl ether of bisphenol A (EPONEX™ 1510 available from Shell Chemical Co.), and 1.32 grams of antioxidant (Irganox 1010 antioxidant available from Ciba Geigy) in a jar. The mixture was heated to about 107° C. to melt the solid epoxy, and then placed on rollers at ambient temperature (about 21° C.) until a uniform adhesive solution resulted.

An acrylate mixture was prepared by mixing 91 parts of the BA/NVC syrup and 9 parts of low acid 2-hydroxy-3-phenoxy propyl acrylate (available from Hampford Research, Inc., Stratford, Conn.). Then 2.4 grams of ethylenebis(salicylimine) (Salen available from Strem Chemicals) were mixed into the acrylate mixture using a Cowles blade. The epoxy mixture (100.11 grams) was added to 102.4 parts of the acrylate mixture and mixed to form a uniform adhesive mixture. The catalysts were added in succession as follows: first 8.92 grams of dicyandiamide were added to the adhesive mixture using a Cowles blade mixer at high speed, and keeping the temperature below about 37° C., and then 5.77 grams of an accelerator (Curezol 2MZ-Azine available from Air Products) were added. In the final step, 1.2 grams of 3-glycidoxypropyltrimethoxysilane (GPTMS available from Huls), 0.47 grams of black pigment (Penncolor 9B117 available from Penncolor), 0.3 grams of benzil dimethyl ketal (KB-1), and 5.61 grams of silica (Aerosil R-972 available from DeGussa) were added and mixed to form a uniform mixture. The adhesive mixture was degassed, and then coated to a thickness of 0.508 mm between two silicone release treated polyester films. The sandwiched coating of adhesive was exposed to ultraviolet light having a majority of its emissions between 300 and 400 nm with a peak emission at 351 nm. The adhesive was exposed to 350 mJ (665 NIST) on the top and bottom, with a total energy of 700 mJ. The intensities were 4.06 milliwatts (mW) on the top and 4.03 mW on the bottom of the adhesive.

Comparative Example C1

A mixture of BA and NVC was prepared by mixing 31.2 grams of BA and 31.2 grams of NVC and heating at about 49° C. until a solution was formed. An acrylate syrup was prepared by mixing 35.3 grams of BA and 2.3 grams of methoxy polyethylene glycol 400 acrylate (PEOA, available from Shin-Nakamura chemical Company, Japan, as AM-90G) with the BA/NVC solution and 0.04 grams of a benzil dimethyl ketal (KB-1 photo initiator available from Sartomer) and subsequently exposing this solution to an ultraviolet light source under constant nitrogen purge to a viscosity of nearly 5000 cps.

To 89 grams of acrylate syrup was added 8 grams of 2-hydroxy-3-phenoxy propyl acrylate (2H3POPA) available from Aldrich Chemicals. Subsequently, 3 grams of a finely powdered phenoxy resin (PKHP-200 from Phenoxy Associates) was slowly added while stirring. Within a period of 15 minutes at room temperature, all of the phenoxy resin was dissolved in the acrylate syrup. Then the catalysts were added: 6.28 grams of dicyandiamide and 4.06 grams of 2-[beta-{2'-methylimid- azoyl-(1')}]-ethyl-4,6-diamino -s-triazine (2MZA, obtained from Air Products) and dispersed into the mixture by using a Cowles blade mixer at high speed, and keeping the temperature below about 37° C. Then 10.1 grams of EPON™ 1001 (diglycidyl ether of bisphenol A, available form Shell Chemical Company) were added to the acrylate mixture and dissolved by stirring, which took approximately 2 hours at room temperature. Then 57 grams of EPON™ 828 and 2.9 grams of EPONEX™ 1510 (both available from Shell Chemical Company) were blended into the mixture. Subsequently 0.1 grams of an antioxidant (Irganox 1010, available from Ciba Geigy) and 5.61 grams of fumed silica (Aerosil R-972 available from Degussa) were added to the mixture and dispersed for 3 hours with a stirrer blade. In the final step, 1.5 grams of hollow glass bubbles (C15/250, available from Minnesota Mining & Manufacturing Co.) and 0.2 grams of KB1 photoinitiator were added and mixed to form a uniform adhesive mixture.

The adhesive mixture was degassed, and then coated to a thickness of 0.508 mm between two silicone release treated polyester films. The sandwiched coating of adhesive was exposed to ultraviolet light having a majority of its emissions between 300 and 400 nm with a peak emission at 351 nm. The adhesive was exposed to 350 mJ (665 NIST) on the top and bottom, with a total energy of 700 mJ. The intensities were 1.3 mW/sqcm on the top and 1.3 mW/sqcm on the bottom of the adhesive. The adhesive was tested for overlap shear strength as described above and test results are shown in Table 1, 2, and 3 for test substrates 1, 2, and 3, respectively.

Examples 2–8

A mixture of BA and NVC was prepared by mixing 31.2 grams of BA and 31.2 grams of NVC and heating at about 49° C. until a solution was formed. A syrup was prepared by mixing 35.3 grams of BA and 2.3 grams of methoxy polyethylene glycol 400 acrylate (PEOA, available from Shin-Nakamura chemical Company, Japan, as AM-90G) with the BA/NVC solution and 0.04 grams of a benzil dimethyl ketal (KB-1 photo initiator available from Sartomer) and subsequently exposing this solution to an ultraviolet light source under constant nitrogen purge to a viscosity of nearly 5000 cps.

A second acrylate mixture was prepared by mixing 11.44 grams of a 50:50 BA/NVC monomer solution, 6.48 grams of BA, 0.43 grams of PEOA and 1.65 grams 2H3POPA. Then 3.8 grams of a chelating agent was dissolved in this monomer blend by mixing with a stirrer blade at room temperature to form a chelating solution. The chelating agent used for each example were as follows: Example 2—Dibenzo-18-crown-6 available from Aldrich Chemicals; Example 3—Ethylenebis(salicylimine); Example 4—catechol available from Aldrich Chemicals; Example 5—salicylaldehyde available from Aldrich Chemicals; and Example 6—glycerol available from Aldrich Chemicals.

To 70.7 grams of acrylate syrup was added 6.3 grams of 2H3POPA. Subsequently, 3 grams of a finely powdered phenoxy resin (PKHP-200 from Phenoxy Associates) was slowly added while stirring. Within a period of 15 minutes at room temperature, all of the phenoxy resin was dissolved in the acrylate syrup. Then the catalysts were added: 6.28 grams of dicyandiamide and 4.06 grams of 2-[beta-{2'-methylimidazoyl-(1')}]-ethyl-4,6-diamino -s-triazine (2MZA, obtained from Air Products) and dispersed into the mixture by using a Cowles blade mixer at high speed, and keeping the temperature below about 37° C.

To this mixture, 10.1 grams of EPON™ 1001 (diglycidyl ether of bisphenol A, available form Shell Chemical Company) was added and dissolved by stirring, which took approximately 2 hours at room temperature. Then 57 grams of EPON™ 828 and 2.9 grams of EPONEX™ 1510 (both available from Shell Chemical Company) were blended in to mixture. Subsequently 0.1 grams of an antioxidant (Irganox 1010, available from Ciba Geigy) and 5.61 grams of fumed silica (Aerosil R-972 available from Degussa) were added to the mixture and dispersed for 3 hours with a stirrer blade. In the final step, 1.5 grams of hollow glass bubbles (C15/250, available from 3M), 0.2 grams of KB1 (benzil dimethyl ketal, available from Sartomer), 1 gram of 3-glycidoxypropyl-trimethoxysilane (GPTMS, available from Aldrich) and 23.8 grams of the chelating solution prepared earlier, were added and mixed to form a uniform mixture. The amounts of silane were 1 part per 100 parts of acrylate, and the chelating agents 3.8 parts per 100 parts of acrylate in which the acrylate was defined as the total of n-butylacrylate, N-vinylcaprolactam, 2-hydroxy-3-phenoxypropylacrylate, poly-ethyleneoxide acrylate, and phenoxy resin.

Subsequent processing and coating procedures were identical to those of Comparative Example C1. The adhesives were tested for overlap shear strength and results are shown in Tables 1, 2, and 3 for test substrates 1, 2, and 3, respectively.

Examples 7–8

Examples 7 and 8 were prepared as Comparative Example 1, except for the fact that an additional 3.8 grams of a chelating agent in the powder form, and 1 gram of GPTMS were added as the final components and subsequently stirred for an additional 30 minutes to form a uniform mixture. The chelating agents used were: Example 7—tetrasodium salt of ethylenediaminetetraacetic acid anhydride (Versene 220 available from Dow Chemical Co.; Example 8—Dimethylglyoxime available from Aldrich Chemicals.

Adhesive tapes were made as described in Example 1 and overlap shear test results are shown in Tables 1, 2, and 3 for test substrates 1, 2, and 3, respectively.

TABLE 1

Overlap Shear Strength on Glass/Aluminum (Substrate 1)

| Exa | INIT MPa | Failure mode | 2 weeks, 70°C. water MPa | Failure mode | 4 weeks, 70°C. water MPa | Failure mode |
|---|---|---|---|---|---|---|
| C1 | 12.94 | 100:0 | 1.12 | 0:100 | 0 | 0:100 |
| 2 | 1.21 | 100:0 | na | na | 10.17 | 85:15 |
| 3 | 15.17+ | glass broke | na | na | 13.25 | 100:0 |
| 4 | 14.73 | 100:0 | na | na | 12.62 | 95:5 |
| 5 | 9.34 | 75:25 | na | na | 9.57 | 100:0 |
| 6 | 13.29 | 100:0 | na | na | 10.71 | 80:20 |
| 7 | 14.63+ | glass broke | 13.55+ | glass broke | 9.28 | 90:10 |
| 8 | 16.49+ | glass broke | 14.88+ | glass broke | 13.83+ | glass broke | na = not available

TABLE 2

Overlap Shear Strength on Stainless Steel (Substrate 2)

| EXA | INIT MPa | Failure mode | 2 weeks, 70°C. water MPa | Failure mode | 4 weeks, 70°C. water MPa | Failure mode |
|---|---|---|---|---|---|---|
| C1 | 13.26 | 100:0 | 7.99 | 50:50 | 5.11 | 70:30 |
| 2 | 1.16 | 100:0 | na | na | 11.08 | 100:0 |
| 3 | 11.88 | 100:0 | na | na | 12.72 | 100:0 |
| 4 | 13.52 | 100:0 | 10.39 | 100:0 | 8.30 | 90:10 |
| 5 | 7.89 | 75:25 | na | na | 10.11 | 75:25 |
| 6 | 14.56 | 100:0 | na | na | 13.06 | 75:25 |
| 7 | 11.21 | 100:0 | 10.37 | 80:20 | 8.85 | 100:0 |
| 8 | 11.9 | 50:50 | 11.34 | 40:60 | 11.01 | 30:70 | na = not available

TABLE 3

Overlap Shear Strength on Aluminum (Substrate 3)

| Exa | INIT MPa | Failure mode | 2 weeks, 70°C. water MPa | Failure mode | 4 weeks, 70°C. water MPa | Failure mode |
|---|---|---|---|---|---|---|
| C1 | 14.34 | 100:0 | 7.94 | 50:50 | 4.75 | 0:100 |
| 2 | 1.16 | 100:0 | na | na | 9.92 | 100:0 |
| 3 | 11.88 | 100:0 | na | na | 9.19 | 100:0 |
| 4 | 13.47 | 100:0 | 13.03 | 100:0 | 8.29 | 100:0 |
| 5 | 7.89 | 50:50 | na | na | 7.02 | 50:50 |
| 6 | 14.56 | 100:0 | na | na | 11.89 | 75:25 |
| 7 | 13.46 | 100:0 | 12.23 | 100:0 | 9.17 | 100:0 |
| 8 | 14.67 | 100:0 | 12.16 | 100:0 | 13.47 | 50:50 | na = not available

Examples 9–31

Examples 9–31 were prepared as Examples 2–6, except that Salen was used for Examples 9–22, and salicylaldehyde was used for Examples 23–31. The amount of chelating agent added to the chelating solution was varied as shown in Table 4. The amount of silane (GPTMS) was also varied as shown in Table 4. The amount of chelating agent and silane are expressed in parts per 100 parts of acrylate as defined in Examples 2–6 above. The examples were tested for overlap shear strength on Substrate 1 and results are shown in Table 4.

TABLE 4

Overlap Shear Strength Between Glass and Aluminum (Substrate 1)

| Exa | GPTMS parts | Chel agent parts | INIT MPa | Failure mode | 1 week, 70°C. water MPa | Failure mode | 4 weeks, 70°C. water MPa | Failure mode |
|---|---|---|---|---|---|---|---|---|
| C1 | 0 | 0 | 12.94 | 100:0 | 4.23 | 0:100 | 0 | 0:100 |
| 9 | 0.5 | 0.5 | na | na | 12.26+ | 100:0 | 8.57 | 75:25 |
| 10 | 0.5 | 1 | na | na | 12.65 | 100:0 | 9.5 | 100:0 |
| 11 | 0.5 | 2 | na | na | 11.93 | 100:0 | 9.5 | 95:5 |
| 12 | 0.5 | 3.8 | na | na | 11.06 | 100:0 | 7.48 | 80:20 |
| 13 | 1 | 0.5 | 14.05 | 100:0 | 13.81+ | glass broke | 9.99 | 80:20 |
| 14 | 1 | 1 | 13.72 | 100:0 | 14.08+ | glass broke | 10.51 | 80:20 |
| 15 | 1 | 2 | 13.1 | 100:0 | 13.94+ | glass broke | 12.26 | 95:5 |
| 16 | 1 | 3.8 | 10.16 | 100:0 | 12.0+ | glass broke | 9.76 | 95:5 |
| 17 | 1.5 | 0.5 | na | na | 10.54+ | glass broke | 8.94 | 95:5 |
| 18 | 1.5 | 1 | na | na | 11.4+ | glass broke | 9.19 | 95:5 |
| 19 | 1.5 | 2 | na | na | 11.48 | 100:0 | 9.95 | 90:10 |
| 20 | 2 | 0.5 | na | na | 11.23 | 100:0 | 8.77 | 90:10 |
| 21 | 2 | 1 | na | na | 10.87 | 100:0 | 8.63 | 90:10 |
| 22 | 2 | 2 | na | na | 11.92 | 100:0 | 10.13 | 90:10 |
| 23 | 0.5 | 0.5 | 13.88 | 100:0 | 12.18+ | glass broke | 10.27 | 75:25 |
| 24 | 0.5 | 1 | na | na | 10.08+ | glass broke | 9.03 | 80:20 |
| 25 | 0.5 | 2 | 10.74+ | glass broke | 12.19+ | glass broke | 9.81+ | glass broke |
| 26 | 1.5 | 0.5 | na | na | 11.61 | 100:0 | 9.79 | 95:5 |
| 27 | 1.5 | 1 | na | na | 10.78 | 100:0 | 9.36 | 95:5 |
| 28 | 1.5 | 2 | na | na | 9.89 | 100:0 | 8.29 | 95:5 |
| 29 | 2 | 0.5 | na | na | 11.88 | 100:0 | 8.8 | 95:5 |
| 30 | 2 | 1 | na | na | 11.07 | 100:0 | 7.84 | 100:0 |
| 31 | 2 | 2 | na | na | 10.61 | 100:0 | 8.82 | 95:5 | na = not available

Comparative Example C2

A solution of BA and NVC both from BASF was prepared by mixing 29 grams of BA and 29 grams of NVC, and heating at about 49° C. until a solution was formed. To this solution, an additional 42 grams of BA and 0.05 grams of hexanedioldiacrylate (HDDA from UCB Radcure, Inc., Smyrna, Ga.) were added. This acrylate monomer solution, 45 grams of diglycidyl ether of bisphenol A (EPON 828 available from Shell Chemical, Co.) and 25 grams of diglycidyl ether oligomer of bisphenol A (EPON 1001 available from Shell Chemical Co.) were placed in a glass jar. The jar was sealed and placed on rollers at ambient temperature (about 21° C.) until a uniform adhesive solution resulted.

To this epoxy/acrylate solution (170.05 parts), 7 grams of dicyandiamide (CG-1200 from Air Products) and 2.7 grams of an accelerator (Curezol 2MZ-Azine available from Air Products) were added and mixed with at Cowles blade mixer at high speed, while keeping the temperature below about 37° C., for 15 minutes. In the final step, 0.24 grams of benzil dimethyl ketal (KB-1), 0.1 grams of Irganox 1010 (antioxidant available from Ciba Geigy), 0.38 grams of Penncolor 9B117, and 8 grams of Cab-o-Sil M5 silica (available from Cabot Corp.) were added and mixed to form a uniform mixture.

The adhesive mixture was degassed, and then coated to a thickness of 0.508 mm between two silicone release treated polyester films. The sandwiched coating of adhesive was exposed to ultraviolet light having a majority of its emissions between 300 and 400 nm with a peak emission at 351 nm to form a pressure sensitive adhesive tape. The adhesive was exposed to 350 mJ (665 NIST) on the top and bottom, with a total energy of 700 mJ. The intensities were 4.06 mW on the top and 4.03 mw on the bottom of the adhesive.

Examples 32–35

An adhesive tape was prepared as described in Comparative Example C2 except that it was primed with one of two chelating agent/silane primer solutions. For Example 32, a primer composition was prepared by mixing 1% aminopropyltrimethoxysilane (available form Aldrich Chemical Company, Milwaukee, Wis.) and 4% thenoyltrifluoroacetone (available from Aldrich) in a 50:50 blend of ethanol/toluene. For Example 33, a primer composition was prepared by mixing 1k aminopropyltrimethoxysilane and 4% glycerol in a 50:50 blend of ethanol/toluene. For Example 34, a primer composition was prepared by mixing 5% aminopropyltrimethoxysilane and 4% thenoyltrifluoroacetone in a 50:50 blend of ethanol/toluene. For Example 35, a primer composition was prepared by mixing 5% aminopropyltrimethoxysilane and 12% thenoyltrifluoroacetone in a 50:50 blend of ethanol/toluene. The primers in Examples 32–33 were applied to the tape by wiping one surface of the adhesive tape using a lint-free Kimwipe tissue (available from Kimberly-Clark) wrapped around a tongue depressor. The tapes were left at room temperature for about 3 minutes to allow the solvent to evaporate. The tapes were then covered with a silcone coated liner. Then the second side of the tapes were coated with the same primer solutions, dried and covered with a silicone coated liner according to the procedure explained earlier. For Examples 34–45, tapes were spray coated twice using a 59.5 gram Preval power unit (available from Precision Valve Corporation, Yonkers, N.Y.) from a distance of about 0.3 meters at an approximate lateral spray head speed of 0.5 meters/minute. The tapes were dried at room temperature for 3 minutes. Both sides of the tapes were spray coated with the same primer solution.

The samples were tested on AISI 304 stainless steel strips (SS) cleaned twice with methyl ethyl ketone, and once with n-heptane, and on the metal side of float glass panels (GLASS) cleaned twice with a 50:50 isopropanol/water blend. Test samples were prepared by laminating the primed surface of a 2.54 cm wide strip of tape to the cleaned surface of the stainless steel strip or the glass panel and subsequently slowly passing a 2337 gram rubber roller two times over the tape. The samples were then cured in an oven at 140° C. for 25 minutes. The samples were immersed in a 0.2% detergent-deionized water solution at 70° C. for 3 days. The water with the immersed samples was then cooled to room temperature. The wet samples were then tested for 90 degree peel adhesion on a Sintech tensile tester (from MTS Systems Corporation, Research Triangle Park, N.C.) at a cross head speed of 5.08 cm per minute. Test results are recorded in Newtons/decimeter (N/dm).

The uncured samples were also tested for peel adhesion under dry conditions one day after priming and 6 days after priming. These samples were tested at a cross head speed of 30.48 cm/minute.

Finally, the samples were tested for overlap shear strength. Samples were prepared as described above from the overlap shear test. The test substrate for Examples 32–33 and C2 was AISI 304 stainless steel (SS), cleaned twice with a 50:50 solution of isopropyl alcohol/deionized water using a clean, lint-free cloth, and the test substrate for Examples 34–35 was e-coated steel (E-COAT)—ED-5100 (available from Advanced Coatings Technology, Inc., Hillsdale, Mich.). The samples were cured at 140° C. for 25 minutes, and conditioned at room temperature for 24 hours before testing. The tests were performed on a Sintech tensile tester using a cross head speed of 0.508 cm/minute, and results are recorded in megaPascals (MPa).

TABLE 5

Surface Primed Tape Performance

| Ex | 90° Peel/Wet—N/dm | | 90° Peel/Dry—N/dm | | Overlap Shear |
| | SS | GLASS | 1-DAY | 6-DAYS | MPa |
| --- | --- | --- | --- | --- | --- |
| C2 | 44.13 | 0.67 | 122.91 | na | 10.46 |
| 32 | 133.86+ | 299.21+ | 121.26 | 107.56 | 4.55 |
| 33 | 116.22 | 63.9 | 114.49 | 91.89 | na |
| 34 | 60.28 | 42.76 | 59.92 | 55.35 | 8.08 |
| 35 | 78.15 | 81.26 | 69.76 | 80.55 | 8.81 | na = not available

Other embodiments are within the following claims. For example, in one embodiment the adhesive may be in the form of a multi-layer structure (e.g., a sheet or a tape) having: a) a first layer of an adhesive composition that does not contain a chelating agent and/or a silane coupling agent, and b) a second layer that includes a blend of asilane coupling agent and a chelating agent. The second layer is coated on a surface (e.g., a first major surface) of the adhesive layer. The silane coupling agent and chelating agent layer can be coated on the adhesive layer using conventional coating methods including spray coating, screen printing, and brush coating. The coating thickness is preferably sufficient to permit the formation of durable structural and semi-structural adhesive bonds to substrates such as glass. The layers may be continuous or discontinuous (e.g., a pattern).

Prior to coating, the silane coupling agent and the chelating agent can be in the form of a solution that includes a silane coupling agent in an amount of between about 0.2 and about 20%, more preferably about 1 and about 5% by weight, and a chelating agent in an amount of between about 2 and 20%, more preferably about 4 and 12% by weight in an organic solvent. Useful organic solvents evaporate rapidly after coating. Examples of suitable organic solvents include, e.g., alcohols (e.g., methanol and ethanol), aliphatic hydrocarbons (e.g., heptane and hexane), and toluene or combinations thereof.

The multi-layer structure may further include a third layer that includes a silane coupling agent and a chelating agent. The third layer is preferably coated on a surface (e.g., a second major surface) of the adhesive layer that is opposite the surface of the adhesive layer on which the second layer is coated.

What is claimed is:

1. A thermosettable adhesive composition comprising:
 a monomeric or partially polymerized composition comprising at least one polymerizable acrylic or methacrylic acid ester of a non-tertiary alcohol;

a thermosettable epoxy resin;

an amine curative;

a silane coupling agent; and a chelating agent.

2. The thermosettable adhesive composition of claim 1, further comprising an ethylenically unsaturated monomer different from said polymerizable acrylic or methacrylic acid ester.

3. The thermosettable adhesive composition of claim 1, further comprising a hydroxy acrylate.

4. The thermosettable adhesive composition of claim 1, wherein said chelating agent comprises aminocarboxylates, crown ethers, 1,3-diketones, imines, oximes, phenols, or polyols.

5. The thermosettable adhesive composition of claim 1, wherein said chelating agent comprises dibenzo-18-crown-6, ethylenebis(salicylimine), catechol, 8-hydroxyquinoline, salicylaldehyde, or glycerol.

6. The thermosettable adhesive composition of claim 1, wherein said chelating agent comprises glycerol.

7. The thermosettable adhesive composition of claim 1, wherein said chelating agent is present in said composition in an amount in the range of between about 0.25 to about 4% by weight of said thermosettable adhesive composition.

8. The thermosettable adhesive composition of claim 1, wherein said silane coupling agent is selected from the group consisting of epoxy silanes, alkoxy silanes, aminosilanes, and combinations thereof.

9. The thermosettable adhesive composition of claim 1, wherein said silane coupling agent is present in said composition in an amount in the range of between about 0.25 to 5% by weight of said thermosettable adhesive composition.

10. The thermosettable adhesive composition of claim 1, wherein said silane coupling agent is present in said composition in an amount in the range of between about 0.25 to 1% by weight of said thermosettable adhesive composition.

11. The thermosettable adhesive composition of claim 1, wherein said epoxy resin is present in said composition in an amount of no greater than about 150 parts per 100 parts of said monomeric or partially polymerized composition.

12. The thermosettable adhesive composition of claim 1, wherein said epoxy resin is present in said composition in an amount in the range of between 50 and 110 parts per 100 parts of said monomeric or partially polymerized composition.

13. The thermosettable adhesive composition of claim 1, wherein the ratio of amine equivalents of the amine curative to epoxy equivalents is in the range of about 0.8:1 to about 1.5:1.

14. The thermosettable adhesive composition of claim 1, wherein said amine curative comprises dicyandiamide.

15. A thermosettable adhesive composition comprising:

a polyacrylate or a polymethacrylate;

a thermosettable epoxy resin;

an amine curative;

a silane coupling agent; and a chelating agent.

16. A method of bonding a first substrate to a second substrate, said method comprising:

providing one of said substrates with a thermosettable adhesive composition comprising (a) a monomeric or partially polymerized composition comprising at least one polymerizable acrylic or methacrylic acid ester of a non-tertiary alcohol, (b) a thermosettable epoxy resin, (c) an amine curative, (d) a silane coupling agent, and (e) a chelating agent;

contacting said thermosettable adhesive composition with the other of said substrates; and thermally curing said thermosettable adhesive composition.

17. The method of claim 16, wherein said substrates comprise glass.

18. The method of claim 16, wherein one of said substrates comprises glass and the other of said substrates comprises metal.

19. The method of claim 16, wherein one of said substrates comprises glass and the other of said substrates comprises ceramic.

20. The method of claim 16, wherein one of said substrates comprises glass and the other of said substrates comprises painted metal.

21. A method of bonding a first substrate to a second substrate, said method comprising:

providing one of said substrates with a thermosettable adhesive composition comprising (a) an polyacrylate or a polymethacrylate, (b) a thermosettable epoxy resin, (c) an amine curative, (d) a silane coupling agent, and (e) a chelating agent;

contacting said thermosettable adhesive composition with the other of said substrates; and thermally curing said thermosettable adhesive composition.

22. A method of bonding a mirror button to a windshield comprising:

providing one of the mirror button or the windshield with a thermosettable adhesive composition comprising (a) a polyacrylate or a polymethacrylate, (b) a thermosettable epoxy resin, (c) an amine curative, (d) a silane coupling agent, and (e) a chelating agent;

contacting said thermosettable adhesive composition with the other of the mirror button or the windshield; and thermally curing said thermosettable adhesive composition.

23. A thermosettable adhesive composition comprising:

a monomeric or partially polymerized composition comprising at least one polymerizable acrylic or methacrylic acid ester of a non-tertiary alcohol;

a thermosettable epoxy resin;

an amine curative;

2-hydroxy-3-phenoxypropyl acrylate;

a silane coupling agent; and a chelating agent.

24. The thermosettable adhesive composition of claim 1, further comprising a photoinitiator.

* * * * *